188. BRAKES
47
N. HODGE.
Car Brake.
Reissued Mar. 1, 1853.
No. 231.
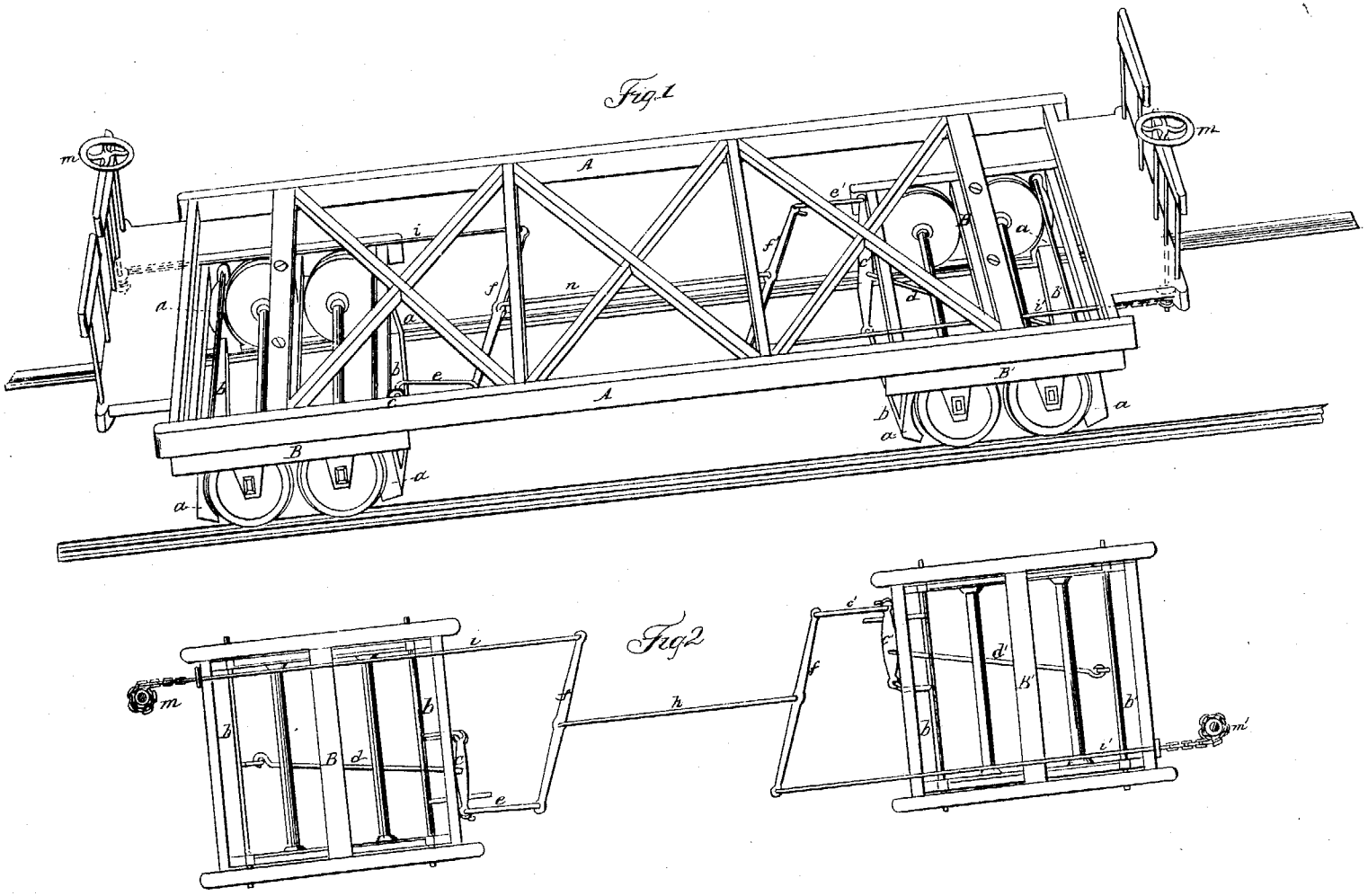
N. PETERS, PHOTO-LITHOGRAPHER, WASHINGTON, D. C.

UNITED STATES PATENT OFFICE.

NEHEMIAH HODGE, OF NORTH ADAMS, MASSACHUSETTS.

IMPROVEMENT IN THE MODE OF OPERATING BRAKES FOR CARS.

Specification forming part of Letters Patent No. 6,762, dated October 2, 1849; Reissue No. 231, dated March 1, 1853.

*To all whom it may concern:*

Be it known that I, NEHEMIAH HODGE, of North Adams, in the county of Berkshire and State of Massachusetts, have invented a new and useful Improvement in Operating the Brakes of Railway-Carriages Constructed with two Truck-Frames; and I do hereby declare the following to be a full, clear, and exact description of the same, and of the characteristics which distinguish it from others heretofore known for such purpose, reference being had to the accompanying drawings, making a part of this specification.

Of the said drawings, Figure 1 represents a perspective view of a car-frame constructed with two trucks or truck-frames, and with my improved mechanism for, or means of operating the brakes applied to it. Fig. 2 is a plan of the two trucks and the brake-operating mechanism.

My invention consists in a combination of mechanism which, when applied to or connected with the brakes of two trucks or truck-frames of a railway-car and two windlasses, respectively situated at the two ends of the floor-frame of a car, shall, when either windlass is put in rotation so as to wind up its chain, bring down at the same time the brakes of both truck-frames upon the wheels thereof with the same degree of force, and whether, when the car is running on the railway, the axles of the wheels of one truck are thrown or moved out of parallelism with those of the other truck or the rubbers or brakes become unequally worn or are of an unequal thickness.

In Fig. 1 of the drawings, A denotes the floor-frame of a car as supported on two four-wheeled trucks, B B′. Each wheel of the truck B has a brake, *a*, hung from the end of the truck-frame, and so as to act against the periphery of the wheel. The two brakes of each pair of wheels of each axle are connected by a cross-bar, *b*. A lever, *c*, is hinged or jointed by one of its extremities to the middle of the inner cross-bar of the brakes of one truck-frame, and its fulcrum is connected by a link-rod, *d*, with the outer cross-bar of the other brakes of said frame. The free or other extremity of this lever *c* is connected by a second link-rod, *e*, extended toward the middle of the car-frame, with one extremity of a second lever, *f*, extending across the frame, or otherwise properly arranged, the rod *e* and the lever being jointed together.

The rods and levers connecting the brakes of the two trucks should be suspended to the under side of the car-frame by hangers or other suitable contrivances, such as will admit of their free longitudinal or lateral movements, such as may be necessary to insure their correct operation. To the other truck, B′, there is to be applied an arrangement and combination of the brakes *a′*, levers *c′ f′*, and link-rods *d′ e′*, precisely or essentially similar to that before described as belonging to the truck B, such contrivances being applied to such trucks B B′ as seen in the drawings, or in any other suitable manner.

The fulcra of the equal and opposite transverse levers *f f′* are connected with each other by the rod *h*, or its equivalent, which is jointed to both levers. The free ends of the transverse levers are respectively connected with the windlasses *m m′* at the opposite ends of the car frame by the rods *i i′* and connecting chairs or mechanical equivalents. Under such circumstances, if the windlass *m* is turned so as to wind up its chain, and there by draw the connecting-rod *i* toward the windlass *m*, the brakes of the truck B will be forced against their respective wheels. As the several levers of the second truck, B′, are respectively equal to those corresponding to them on the truck B, and as the two sets are connected by the two levers *f f′* and the rod *h*, which are free to move toward either truck-frame, it is evident that when power is applied to operate on the windlass and depress the brakes of the truck B, power by the connecting levers and rod will be simultaneously transferred to the brake-lever of the other truck-frame, so as to bring its brakes down against the peripheries of the wheels thereof, and with a like degree or amount of force. Whichever windlass is operated the result will be the same.

By this combination it is plain that the brakes of a car with two trucks, or the double-truck car, or the "long car," as it is usually termed, are brought down simultaneously upon the wheels of both trucks whenever either windlass is operated or wound up.

As the brakes of the truck B are brought down upon the wheels thereof by a force equal to that exerted by the windlass on the lever $f$, the fulcrum of the said lever receives a draft force equal to double the force on the windlass, supposing the fulcrum to be at the middle of the lever. This double force acting on the said fulcrum is communicated through the rod $h$ to the fulcrum of the other lever $f'$, and by it equally divided between the rod $i'$ and the brake-lever $c'$. The rod $i'$ being checked by its windlass, or prevented from being drawn toward the middle of the car, all the motion imparted to the lever $f'$ will be employed to operate the brake-lever of the truck B′ and bring down the brakes thereof upon their wheels, and with a like force to what is exerted on the other truck B, or on the brakes thereof. Either lever, $f$ or $f'$, when pulled upon by its windlass, not only performs the office of putting in action the brake-lever connected with it, so as to cause it to bring down upon the wheels the brakes of its truck, but it also, through the connection rod $h$, sets in action the corresponding lever and the brake-lever of the other truck.

As the fulcra of the several levers are not made stationary, but left free to accommodate themselves and the corresponding levers and brake levers to any departure from parallelism of the axles of one truck with those of the other truck, or any wear or inequality of thickness of the brakes, brake-rubbers, or linings, the bringing down of the brakes of both trucks simultaneously and with a like degree of force when either windlass is actuated as described is completely secured.

In the arrangement of the parts represented in the drawings it will be seen that by the inclination of the levers $c$ $c'$ in opposite directions the force acting upon the brakes at any time when applied is neither increased nor diminished in running from a straight track onto a curve, or vice versa, or on a curve. It will therefore be perceived what an important part the two levers $f$ $f'$, and the rod $h$ perform in connection with the two brake-levers $c$ $c'$ and the rods $d$ $d'$. It is not essential to my invention that the exact arrangement of any one or more of its parts, as exhibited in the drawings, be always preserved, as the same may be changed so long as the combination or principle constituting the invention be maintained and its parts disposed and connected so as to produce the effect of bringing down upon the wheels when either windlass is turned up the brakes of the tow trucks simultaneously, and with a like degree of force, practically speaking, not only while running on a straight track or on a curve, or under an inequality of the thickness of the rubbers or linings of the brakes, as stated.

I am aware that the brakes of a car made with trucks or truck-frames have before the date of my invention been connected in different ways, so that the brakes of both trucks could be brought down simultaneously upon the wheels by the action of either windlass. I therefore do not claim any machinery for doing merely this; but when this has been done the machinery applied to the windlass and brakes of the trucks has not been such as to cause, under all or nearly all circumstances, while the car is in operation or running on a railway-track in which there may be curves or deflections from straight lines in the laying of its rails, and when either windlass is put in operation, the like amount of force which may be brought to act upon the brake-lever of one truck to act (through the movable rod or connecting mechanism) upon the brakes of the opposite truck.

I therefore claim—

My improvement in actuating the brakes of a car having two trucks—that is to say, a combination of two levers, $f$ $f'$, a rod, $h$, two levers, $c$ $c'$, and rods $d$ $d'$, as applied to the brakes and two windlasses of the car, and operated by either of the windlasses so as to bring down at the same time the brakes of both trucks upon the wheels thereof with the same, or practically the same, degree of force, and whether when the car is running on the railway the axles of one truck, or of the wheels of one truck, are thrown or moved out of parallelism with those of the other truck, or the rubbers or brakes become unequally worn or of an unequal thickness, as above stated.

In testimony whereof I have hereunto set my signature this 28th day of December, A. D. 1852.

NEHEMIAH HODGE.

Witnesses:
E. D. WHITAKER,
E. NORMAN.